(12) United States Patent
Friedmann et al.

(10) Patent No.: US 8,793,248 B2
(45) Date of Patent: Jul. 29, 2014

(54) METHOD AND SYSTEM FOR RECOMMENDING GEO-TAGGED ITEMS

(75) Inventors: Michael Friedmann, Bonn (DE); David Ben-Shimon, Beer Sheva (IL); Lior Rokach, Omer (IL)

(73) Assignee: YooChoose GmbH, Cologne (DE)

( * ) Notice: Subject to any disclaimer, the term of this patent is extended or adjusted under 35 U.S.C. 154(b) by 47 days.

(21) Appl. No.: 13/453,040

(22) Filed: Apr. 23, 2012

(65) Prior Publication Data

US 2012/0303626 A1 Nov. 29, 2012
US 2014/0046946 A2 Feb. 13, 2014

(30) Foreign Application Priority Data

Apr. 26, 2011 (IL) .......................... 212502

(51) Int. Cl.
*G06F 17/30* (2006.01)
*G06F 15/16* (2006.01)
*G06Q 30/00* (2012.01)

(52) U.S. Cl.
CPC ............... *G06F 17/30* (2013.01); *G06F 15/16* (2013.01); *G06Q 30/00* (2013.01)
USPC ........... 707/732; 707/748; 707/752; 707/754; 707/758; 709/203; 709/206; 705/7.34; 705/26.64

(58) Field of Classification Search
CPC .......... G06F 17/30; G06F 15/16; G06Q 30/00
USPC .................. 709/203, 206, 215–220; 707/688, 707/705–709, 720–728, 748–754, 731–732, 707/758; 705/7.34, 14.6, 26.1, 26.64
See application file for complete search history.

(56) References Cited

U.S. PATENT DOCUMENTS

| | | | | |
|---|---|---|---|---|
| 5,790,426 A | * | 8/1998 | Robinson | 702/179 |
| 5,884,282 A | * | 3/1999 | Robinson | 705/7.33 |
| 5,905,973 A | * | 5/1999 | Yonezawa et al. | 705/26.8 |

(Continued)

FOREIGN PATENT DOCUMENTS

| | | | |
|---|---|---|---|
| WO | WO 02/082816 | * | 10/2002 |
| WO | WO 2008/124285 | * | 10/2008 |
| WO | WO 2009/151928 A2 | | 12/2009 |

OTHER PUBLICATIONS

Manos Papagelis et al., "Qualitative analysis of user-based and item-based prediction algorithms for recommendation agents",Engineering Applications of Artificial Intelligence 18 (2005) 781-789.*

(Continued)

*Primary Examiner* — Srirama Channavajjala
(74) *Attorney, Agent, or Firm* — Alston & Bird LLP (57) ABSTRACT

A recommender system for recommending items to a user based on geo-Tagged information related to him, in which items associated with a GeoTag are stored in a database. Feedback regarding the various items is obtained from the user and the provided rating of items is propagated to closely located items based on their associated GeoTags. A user-to-user similarity matrix is calculated and a predicted score is assigned for each user and item, using a recommendation server. All the items in the catalog of items are sorted according to their predicted scores as calculated for the user, and all items that have been already rated by the user are filtered out. Then, items from the catalog of items are presented to the user, according to their scores.

16 Claims, 4 Drawing Sheets

(56) References Cited

U.S. PATENT DOCUMENTS

| | | | |
|---|---|---|---|
| 6,049,777 A * | 4/2000 | Sheena et al. | 705/7.32 |
| 6,112,186 A * | 8/2000 | Bergh et al. | 705/7.32 |
| 6,438,579 B1 * | 8/2002 | Hosken | 709/203 |
| 7,440,943 B2 | 10/2008 | Grasso et al. | |
| 2002/0052873 A1 * | 5/2002 | Delgado et al. | 707/7 |
| 2005/0125280 A1 * | 6/2005 | Carr et al. | 705/10 |
| 2006/0041548 A1 * | 2/2006 | Parsons et al. | 707/5 |
| 2008/0016205 A1 * | 1/2008 | Svendsen | 709/224 |
| 2008/0132251 A1 * | 6/2008 | Altman et al. | 455/457 |
| 2008/0222295 A1 * | 9/2008 | Robinson et al. | 709/227 |
| 2009/0193099 A1 | 7/2009 | Partridge et al. | |
| 2009/0240771 A1 * | 9/2009 | Capobianco | 709/204 |
| 2009/0281875 A1 | 11/2009 | Tarka | |
| 2010/0042608 A1 * | 2/2010 | Kane, Jr. | 707/5 |
| 2010/0076968 A1 * | 3/2010 | Boyns et al. | 707/732 |
| 2010/0262658 A1 * | 10/2010 | Mesnage | 709/204 |

OTHER PUBLICATIONS

European Search Report for Application No. EP 12 16 4993 dated Jun. 22, 2012.

* cited by examiner

METHOD AND SYSTEM FOR RECOMMENDING GEO-TAGGED ITEMS

CROSS-REFERENCE TO RELATED APPLICATION

This application claims priority from Israeli Patent Application No. 212502, filed Apr. 26, 2011, which is incorporated by reference herein in its entirety.

FIELD OF THE INVENTION

The present invention relates to the field of recommender systems. Specifically, this invention relates to a recommender system which is designed to recommend objects to a user based on Geo-Tagged information related to him.

BACKGROUND OF THE INVENTION

With the escalating amount of data available online, recommender systems became very popular, especially on web sites. As known in the art, recommender systems are systems that recommend items to users. Such systems have various applications such as helping users find web pages that interest them, recommending products to customers in e-commerce websites, recommending TV programs to users of interactive TV and displaying personalized advertisements. There are many types of recommender systems ranging from manually predefined un-personalized recommendations to fully automatic general purpose recommendation engines.

Recommender systems are software tools aimed at supporting their users in decision-making. Recommender Systems are supposed to be used by people that do not have sufficient personal experience or competence to evaluate the, potentially overwhelming, number of alternatives offered in a web site. Specifically, in many web-based sites the aim of recommender systems is to suggest items to the users.

One type of recommendation systems is context-aware. US 2009/0193099 (Partige et al.) and US 2009/0281875 (Beatrice) disclose context-aware recommender systems which incorporate user's contextual information such as time, location, into the recommendation. Another type of recommendation systems is location-based. Location-based recommender systems aim to find the most relevant items to the current location of the user. For example, a restaurant recommender system recommends restaurants according to the geographic proximity of the user to the recommended restaurants. US 2009/0281875 discloses another type of recommender systems, namely travel recommender systems. Travel recommender systems recommend users on places to visit. Once the user input his destination the system recommends sites to see.

However, the traditional methods hereinabove match the current location of the user to the location of the items available for recommendation and recommend item in the geographic proximity of the user. In many cases such solution prevents the user from receiving recommendations regarding items from a far surrounding which may be of high interest to the user. Additionally, some traditional methods require to infer the preferences of the user from the user's contextual information which in many cases is not related to the preferences of the user and in some cases may even deceive, for example if a user writes "I would prefer any thing other then Pizza", a context-aware recommender system may infer that the user prefer Pizza and recommends him pizzerias in his geographic proximity.

GeoTagging is the process of adding geographical identification metadata to various media such as photographs, video, websites, SMS messages, RSS feeds, and other. GeoTagging is a form of geospatial metadata. These data usually consist of latitude and longitude coordinates, though it can also include altitude, bearing, distance, accuracy data, and place names. One of the most common uses of GeoTagging is by photographs which takes geoTagged photographs. GeoTagging can help users to find a wide variety of location-specific information. For instance, one can find images taken near a given location by entering latitude and longitude coordinates into a suitable image search engine. GeoTagging-enabled information services can also be used to find location-based news, websites, or other resources. GeoTagging can tell users the location of the content of a given picture or other media or the point of view, and conversely on some media platforms show media relevant to a given location.

In some cases users are interested in news coming from a specific location disregarding their current or future physical location. For example, a reader might be interested in news from his born place even if he does not live there anymore. Readers might be also interested in reading news from different conflict areas. News recommender systems according the traditional methods are frequently use content based recommendation methods. Due to the fact that the location name is frequently mentioned in the article text, content based methods can take the geo-location into consideration to some extent. However they might neglect obvious geo-relations. For example if a user likes an article which mentions the city "Frankfurt" then the content based recommender systems will probably know to recommend other news coming from "Frankfurt". However it will not be able to recommend news coming from the city "Darmstadt" even if it is only 20 km away.

Some existing news recommender systems are using 'nearest neighbors' algorithms to calculate the content distance between two articles. These systems can be adjusted to take into consideration also the geographical distance between the locations of two articles in addition to the content distance. However, these kinds of solutions are usually user based and are only capable of recommending articles located closely to previously clicked news and cannot be used to recommend entirely new locations. For example, if a reader reads news coming from ancient cities such as Rome, Jerusalem, and Lisbon then he might be interested in news coming from other ancient cities such as Athens and Plovdiv.

Collaborative filtering (CF) is the process of filtering for information or patterns using techniques involving collaboration among multiple agents, viewpoints, data sources, etc. Collaborative filtering is a method of making automatic predictions (filtering) about the interests of a user by collecting taste information from many users (collaborating). The underlying assumption of the CF approach is that those who agreed in the past tend to agree again in the future. For example, a collaborative filtering or recommendation system for television tastes could make predictions about which television show a user should like given a partial list of that user's tastes (likes or dislikes). These predictions are specific to the user, but use information gleaned from many users.

U.S. Pat. No. 7,440,943 discloses a collaborative filtering systems for improving the recommendation results achieved by the recommendation system. However while existing collaborative filtering systems find similarities based on users consumptions or rating of items. We also take into consideration the location attached to the item. Theoretically, collaborative filtering can be used for discovering new interesting locations and based on this information to find related items.

However, it is not practical to simply refer to the geo-location as "items" like in any other CF application, because in fine-grained application there will be tremendous number of locations or even a much higher number of geo-location information that might be pointing to the same location.

It would therefore be highly desirable to provide a recommendation system that overcomes the drawbacks of the existing systems. Such a system would recommend objects based on geo-tagged data attached to them, rather than based on the location of the user and the items.

It is therefore an object of the present invention to provide a method for recommending objects from certain locations which are of interest to the user.

It is another object of the present invention to provide a method for recommending fine-grained geo-tagged items.

It is yet another object of the present invention to provide a method which extends existing nearest neighbors collaborative filtering systems for improving the recommendation results.

Other objects and advantages of the invention will become apparent as the description proceeds.

SUMMARY OF THE INVENTION

The present invention is directed to a recommender system for recommending items to a user based on geo-Tagged information related to him, in which items associated with a GeoTag are stored in a database. Feedback regarding the various items is obtained from the user and the provided rating of items is propagated to closely located items, based on their associated GeoTags. A user-to-user similarity matrix is calculated and a predicted score is assigned for each user and item, using a recommendation server. All the items in the catalog of items are sorted according to their predicted scores as calculated for the user, and all items that have been already rated by the user are filtered out. Then, items from the catalog of items are presented to the user, according to their scores.

The recommendation of items to the user may be provided through an appropriate electronic device taken from the group consisting of: personal computers, mobile computers, PDAs, cameras, and cellular phones. The recommendation server may take into consideration the geographic distance of the geo-tagged items, the geographical information, and the user rating in the recommendation process and may recommend fine-grained GeoTagged items by incorporating geo-information and user's rating during a recommendation process.

The recommendation server may also measure similarity according while taking into consideration the geographic distance of the GeoTagged items and finds new geographical places and items related to those places that are of interest to the user and may recommend items associated to close-by locations and items in similar locations elsewhere.

The recommendation server may also include a mechanism adapted for servicing requests from a user for computational and data storage resources.

The database may contain information and algorithms required for analyzing the GeoTag information, as well as a storage system for storing data in a non-volatile storage. The database may also contain a table for storing the feedbacks obtained from users regarding the various items.

The calculated user-to-user similarity matrix may contain pairs of values, wherein each pair is assigned to each entry in the user-item matrix. The first value may represent the mean propagated rating and the second value refers to the total propagated weights.

Each item may be associated with Longitude and Latitude information for calculating the geographical distance between any pair of items by using database built-in functions.

The recommendation server may calculate a user-to-user similarity matrix for each pair of users according to the revised Pearson correlation:

$$sim(u, s) = \frac{\sum_j (v[u, j] - v_u \times w[u, j])(v[s, j] - v_s \times w[s, j])}{\sqrt{\sum_j (v[u, j] - v_u \times w[u, j])^2 \sum_j (v[s, j] - v_s \times w[s, j])^2}}$$

The rating may be of a binary type, implicit or explicit, or may be determined by observing the user's behavior. The rating may also be a "visited" or a "check-in" event.

Also, the time and date of each rating may be recorded for recommending locations and the time attribute is used to further distinct the ratings of the user, while calculating a recommendation.

DETAILED DESCRIPTION OF PREFERRED EMBODIMENTS

The recommendation system proposed by the present invention is capable of recommending items to users of any appropriate electronic device, such as personal computers, mobile computers, PDAs, cameras, and cellular phones. The system can further be modeled to recommend practically any type of data, e.g., media, music, books, etc. As a matter of convenience only, reference herein is made mainly to the recommendation of media data. This is not intended to limit the invention in any manner.

The present invention provides a system and method for recommending objects to a user based on GeoTagged information related to him. For example, when the user takes geo-Tagged photographs of a certain location, the system is adapted to offer him similar locations for taking photographs. The method is adapted to take into consideration the geographic distance of the geo-tagged items, the geographical information, and the user rating in the recommendation process, and recommends new geographical places and related items that are of interest to the user.

In one embodiment, the system according to the present invention recommends fine-grained GeoTagged items by incorporating geo-information and user's rating during the recommendation process. The method extends existing nearest neighbors collaborative filtering systems by revising the way they perform their analysis. Extending the existing collaborative filtering methods is performed by taking into consideration fine-grained geo-information. In one embodiment, the similarity measures according to the present invention takes into consideration the geographic distance of the geo-tagged items and is used to find new geographical places and items related to those places that are of interest to the user. For example, the present invention assumes that if the user likes a photo taken in a certain location, he will probably like other photos taken not only in close-by locations but also in similar locations elsewhere. Therefore, the present invention is adapted to recommend new photos based on the geo-data attached to photos interested the user in the past.

Figure 1:
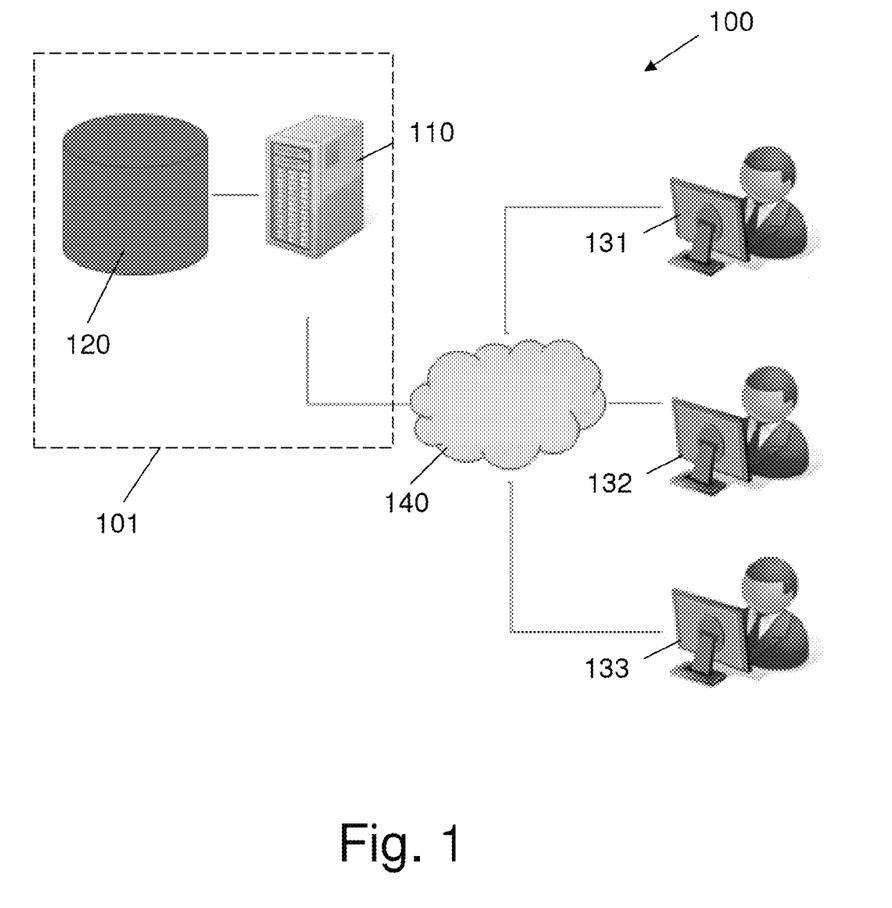
FIG. 1 schematically illustrates a recommendation system in its environment according to one embodiment of the present invention.

FIG. 1 schematically illustrates a recommendation system in its environment according to one embodiment of the present invention. Recommendation environment 100 includes a number of computer systems based on a micropro-cessor, a mainframe computer, a digital signal processor, or a computational engine within an appliance. In this embodiment, recommendation system 101 includes a recommendation server 110 and a database 120. Recommendation system 101 is connected to clients 131-133 through network 140. In one embodiment, recommendation server 110 includes any node on a network including a mechanism for servicing requests from a client (user listed to the service) for computational and/or data storage resources. In one embodiment, database 120 contains information and algorithms required by recommendation server 110 for analyzing the GeoTag information. Database 120 also includes a storage system for storing data in non-volatile storage. This includes, but not limited to, systems based upon magnetic, optical, or magneto-optical storage devices, as well as storage devices based on flash memory and/or battery-backed up memory.

In one embodiment of the present invention, database 120 includes a relational database management system. The database stores a catalog of items. Each item is identified with an Item_ID and is GeoTagged (for example, associated with Longitude and Latitude data). In addition, giving the set of users that are registered to the system, each user is identified with a user identifier (User_ID). The feedback of the users regarding the various items is stored in additional table. In one embodiment, network 140 includes any type of wired or wireless communication channel capable of coupling together computing nodes. This includes, but not limited to, a local area network, a wide area network, or a combination of networks. In one embodiment of the present invention, network 140 includes the Internet.

Clients 131-133 may include any node on a network including computational capability and including a mechanism for communicating across the network, such as personal computer. The clients are operated by the users which are either individuals or a group of individuals. The user interacts with recommendation system 101 via his client.

Figure 2:
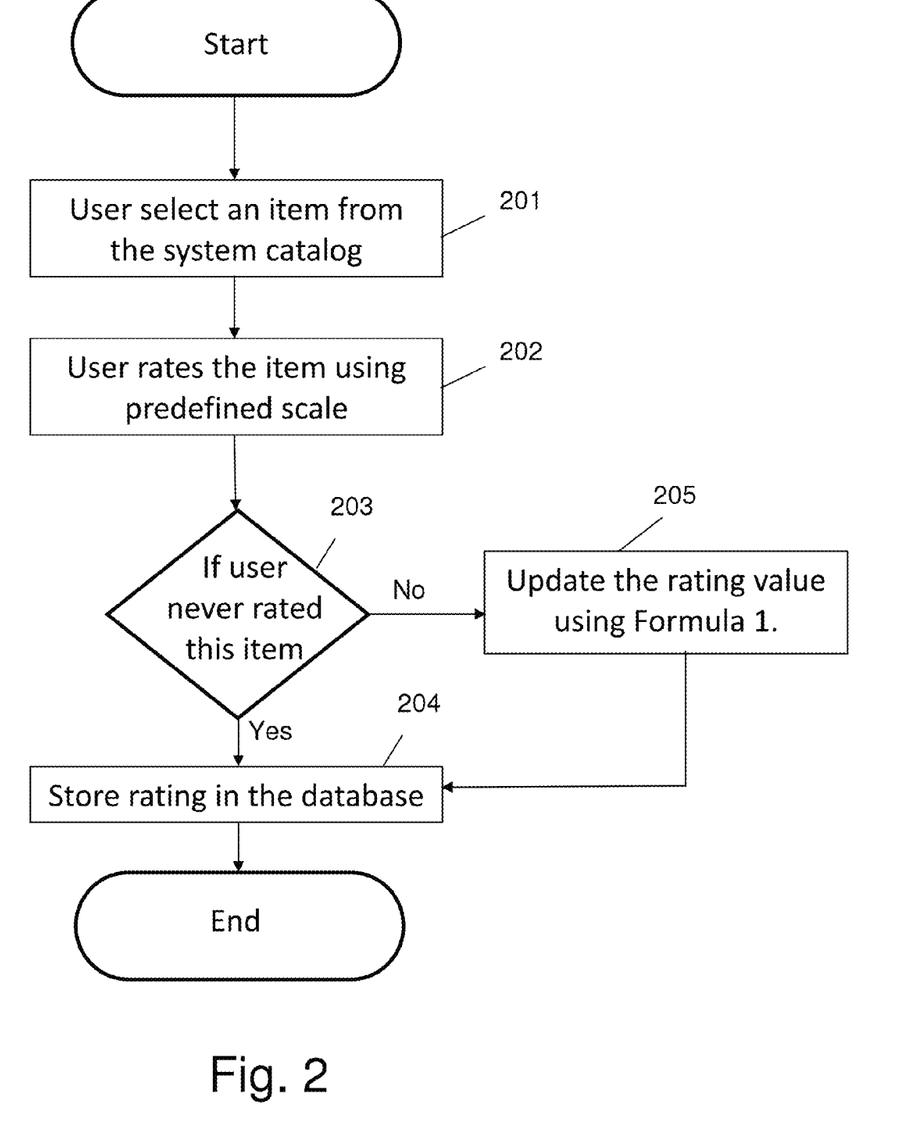
FIG. 2 is a schematic flow chart of the process of updating the users rating.

In one embodiment, the method according to the present invention implements three major phases. In the first phase, the method obtains feedback from the users which provide feedback on geo-tagged items. It is assumed that the feedback is provided in a certain scale. For example, using a '5 stars' scale where 5 stars indicate that the item is most preferred by the user. FIG. 2 is a schematic flow chart of the process of updating the users rating. In the first step 201, the user selects an item from the system items catalog presented to him. In the next step 202, the user rates the item using a predefined scale. The rating may also be of a binary type (a thumb-up "1" or thumb down "0") rating and could either be implicit or explicit, by observing the user's behavior. Another type of popular rating may be a "visited" or a "check-in" event, as "checking-in" into a location (e.g., into Facebook, Google, etc).

In step 203 the system checks whether the item was previously rated or not. If the user provided a rating to a previously unrated item, the system keeps 204 the new rating in a suitable table in the database. However, if the user provided a rating to a previously rated item, the system calculates 205 a new rating of user u to item i according to the following formula:

$$\text{Rating}[u,i] = \alpha \times \text{NewEnteredRating}[u,i] + (1-\alpha) \times \text{CurrentlyStoredRating}[u,i] \quad (1)$$

wherein NewEnteredRating refers to the rating entered now by the user, CurrentlyStoredRating indicates the current rating stored in the system, and $\alpha$ denotes the weight provided to the new rating compared to currently stored rating.

In addition, the time and date of each rating is recorded, for example for recommending locations like bars or restaurants. The time at which a user visited a restaurant (for brunch, lunch or dinner) may be very relevant and as a result, recommending another location in the morning rather than in the evening. It is possible to use the usage field or the time in the area of rating. When using a time attribute, it is also possible to further distinct the ratings of the user and to include the time, while calculating a recommendation.

Figure 3:
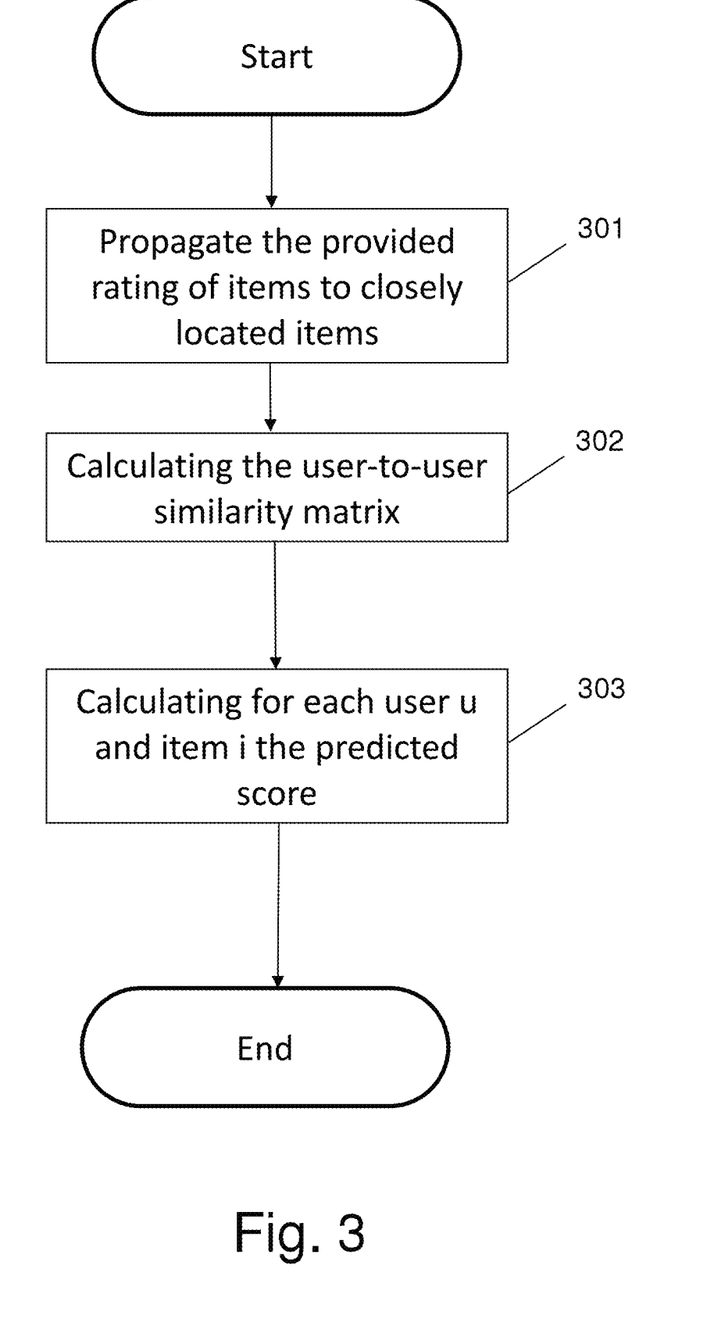
FIG. 3 is a schematic flow chart of the process of building a user-to-user similarity matrix, every period of time, by the recommendation server.

In the second phase, the method finds similar users to all users in the system. In every period of time (e.g., every day) the recommendation server builds a user-to-user similarity matrix based on the flow chart presented in FIG. 3. In the first step 301, the system propagates the provided rating of items to closely located items based on their associated GeoTags. In one embodiment, a pair of values is assigned to each entry in the user-item matrix. The first value is v[u,i] represents the mean propagated rating. The second value w[u,i] refers to the total propagated weights. The values of v[u,i] and w[u,i] are calculated using the following formulas:

$$v[u, i] = \text{Rating}[u, i] + \frac{1}{n[u]-1} \sum_{\forall j \neq i; \text{Rating}[u,j] \text{ is unknown}} \frac{\text{Rating}[u, j]}{(dist(i, j) + k)^2} \quad (2)$$

$$w[u, i] = 1 + \frac{1}{n[u]-1} \sum_{\forall j \neq i; \text{Rating}[u,j] \text{ is unknown}} \frac{1}{(dist(i, j) + k)^2} \quad (3)$$

It can be seen from the equations hereinabove that the sum operation iterates over all items that have been rated by the user u. The function dist(i,j) is the geographical distance of item i to item j calculated in a certain units (e.g., meter or feet). In this embodiment, each item is associated with Longitude and Latitude information. Thus, their geographical distance between any pair of items can be easily calculated by the recommendation server, for instance by using database built-in functions (for example, function STDistance in SQL Server 2008). The entry n[u] indicates the number of items rated by the user u. The parameter k represents the importance of the original rating provided by the user u to item i and have only positive values according to one embodiment. If k gets a high value it means that v[u,i] is mainly determined by the original rating provided by the user.

In the second step 302, the recommendation server calculates a user-to-user similarity matrix. For each pair of users the system calculates the similarity according to the revised Pearson correlation:

$$sim(u, s) = \frac{\sum_j (v[u, j] - v_u \times w[u, j])(v[s, j] - v_s \times w[s, j])}{\sqrt{\sum_j (v[u, j] - v_u \times w[u, j])^2 \sum_j (v[s, j] - v_s \times w[s, j])^2}} \quad (4)$$

The revised Pearson correlation takes into consideration the weight provided to the propagated rating. In the last step 303 the system calculates and assigns for each user u and item i the predicted score P[u,i] according to the following formula:

$$p[u, i] = \sum sim(u, s) \times \frac{v[s, i]}{w[s, i]} \quad (5)$$

Figure 4:
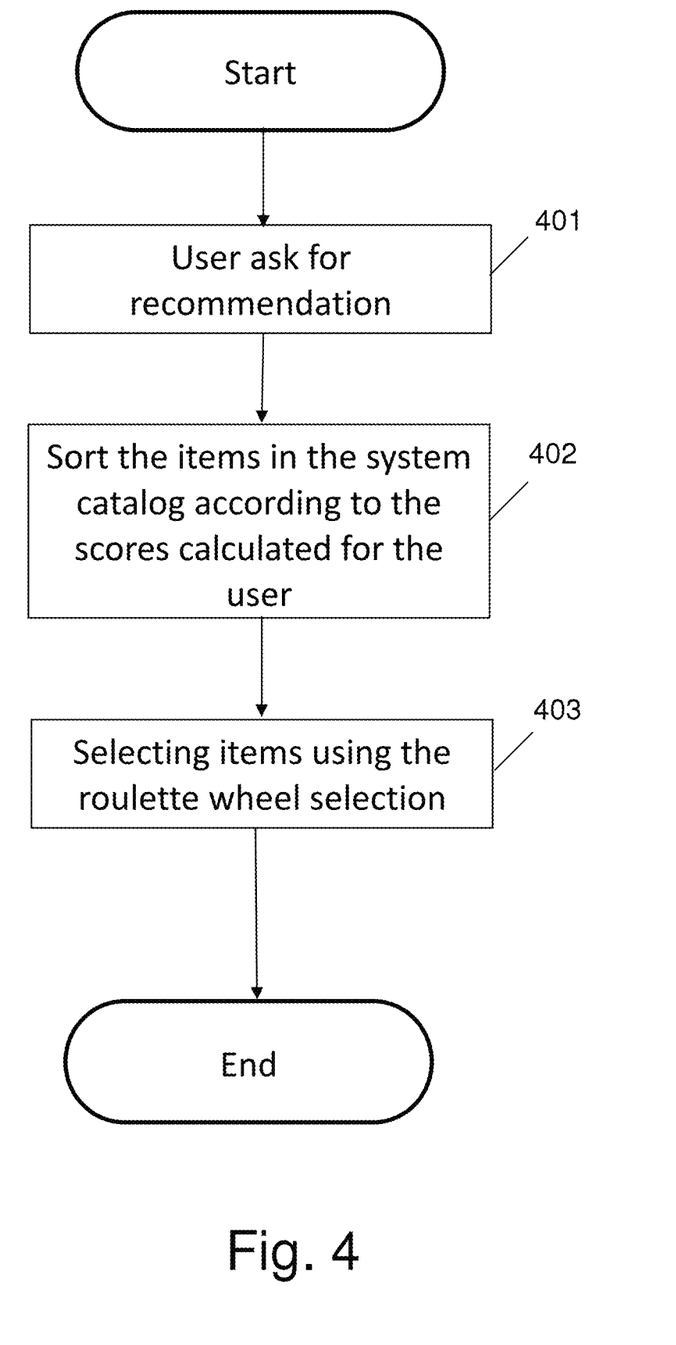
FIG. 4 presents an exemplary flow chart illustrating the process of automatically recommending items to the user.

In the third and final phase according to this embodiment, the recommendation server performs the recommendation of new items to the user. FIG. 4 presents an exemplary flow chart illustrating the process of automatically recommending items to the user. Once user u asks for recommendation in step 401, in the next step 402 the system sorts all items in the system catalog according to their scores p[u,i], as calculated for the user. From this list, all items that have been already rated by the user are filtered out, and the items finally presented to the user are selected using the roulette wheel selection (i.e., items are given a probability of being selected that is directly proportionate to their scores).

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

The invention claimed is:

1. A recommender system for automatically recommending items to at least one electronic device of one or more users, based on geo-tagged information related to said user, comprising:
    a database for storing data in a non-volatile storage, each of which being associated with a GeoTag;
    a recommendation server, in communication with said database and being connected to said electronic devices via a client application and over a data network, configured to:
        obtain, over said data network, rating values from the user regarding geo-tagged items stored in said database in a form of a user-item matrix;
        form weighted rating values for said items being closer than a predetermined geographical distance, wherein said weighted rating values are weighted according to:
            a geographical distance between a pair of items;
            the items previously rated by said user;
            a level of similarity between the user and other users; and
            preferences of similar other users to said user;
        propagate a user-item matrix with the weighted rating values;
        construct a user-to-user similarity matrix by calculating the similarity for each pair of users using a correlation measure, wherein the user-to-user similarity matrix contains pairs of values, wherein each pair is assigned to each entry in the user-item matrix;
        assign a weighted score for each user and item according to the level of similarity to other users;
        sort, in said database, all the items in the form of a catalog of items according to their weighted scores as calculated for the user and filtering out all items that have been already rated by said user; and
        automatically present to the user, on the electronic device of the user, items from said catalog of items, rated according to their weighted scores, wherein presented items are fine-grained geo-tagged items that are recommended based on geo-information and user's rating.

2. The recommender system according to claim 1, wherein the at least one electronic device is selected from the group consisting of:
    personal computers;
    mobile computers;
    PDAs;
    Cameras; or
    cellular phones.

3. The recommender system according to claim 1, wherein the recommendation server measures similarity by analyzing the geographic distance of the GeoTagged items and finds new geographical places and items related to those places that are of interest to the user.

4. The recommender system according to claim 1, wherein the recommendation server recommends items associated to close-by locations and items in similar locations elsewhere.

5. The recommender system according to claim 1, wherein the recommendation server includes a mechanism adapted to service requests from a user for computational and data storage resources.

6. The recommender system according to claim 1, wherein the database contains data and processes for analyzing the GeoTag information.

7. The recommender system according to claim 1, wherein the database contains a table for storing the feedbacks obtained from users regarding the various items.

8. The recommender system according to claim 1, wherein each pair includes a first value that represents the mean propagated rating and a second value that refers to the total propagated weights.

9. The recommender system according to claim 1, wherein each item is associated with Longitude and Latitude information for calculating the geographical distance between any pair of items by using database built-in functions.

10. The recommender system according to claim 1, wherein the recommendation server calculates a user-to-user similarity matrix for each pair of users according to the revised Pearson correlation:

$$sim(u, s) = \frac{\sum_j (v[u, j] - v_u \times w[u, j])(v[s, j] - v_s \times w[s, j])}{\sqrt{\sum_j (v[u, j] - v_u \times w[u, j])^2 \sum_j (v[s, j] - v_s \times w[s, j])^2}}.$$

11. The recommender system according to claim 1, wherein the rating is of a binary type.

12. The recommender system according to claim 1, wherein the rating is implicit or explicit.

13. The recommender system according to claim 1, wherein the rating is determined by observing the user's behavior.

14. The recommender system according to claim 1, wherein the rating is a "visited" or a "check-in" event.

15. The recommender system according to claim 1, in which the time and date of each rating is recorded for recommending locations.

16. The recommender system according to claim 1, in which the time attribute is used to further distinct the ratings of the user, while calculating a recommendation.

* * * * *